(12) United States Patent
Tkac et al.

(10) Patent No.: US 11,115,599 B2
(45) Date of Patent: Sep. 7, 2021

(54) AUTOMATIC CORRECTION OF CAMERA VIEWS

(71) Applicant: International Business Machines Corporation, Armonk, NY (US)

(72) Inventors: Vincent Tkac, Delaware, OH (US); Keith G. Frost, Delaware, OH (US); Andrew C. Myers, Columbus, OH (US); Joshua M. Rice, Marysville, OH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/742,369

(22) Filed: Jan. 14, 2020

(65) Prior Publication Data
US 2021/0218899 A1 Jul. 15, 2021

(51) Int. Cl.
*H04N 5/232* (2006.01)
*H04N 9/73* (2006.01)
*H04N 9/64* (2006.01)

(52) U.S. Cl.
CPC ..... *H04N 5/23299* (2018.08); *H04N 5/23206* (2013.01); *H04N 5/23222* (2013.01); *H04N 9/646* (2013.01); *H04N 9/73* (2013.01)

(58) Field of Classification Search
CPC .............. H04N 5/23299; H04N 9/646; H04N 5/23222; H04N 9/73; H04N 5/23206
See application file for complete search history.

(56) References Cited

U.S. PATENT DOCUMENTS

| 8,421,876 | B2 | 4/2013 | Chou |
| 9,025,033 | B2 | 5/2015 | Niem et al. |
| 9,883,104 | B2 | 1/2018 | Wakamatsu |
| 9,924,100 | B2 | 3/2018 | Wakamatsu |
| 2005/0018053 | A1* | 1/2005 | Suga ............ H04N 7/147 348/211.13 |
| 2005/0117033 | A1 | 6/2005 | Matsui |
| 2016/0127691 | A1 | 5/2016 | Bokowski et al. |
| 2017/0070661 | A1* | 3/2017 | Niida .............. H04N 5/23296 |

FOREIGN PATENT DOCUMENTS

| CN | 108833784 A | 11/2018 |
| IN | 2138CH2011 A | 8/2015 |
| WO | 2012/105499 A1 | 8/2012 |

* cited by examiner

*Primary Examiner* — Ahmed A Berhan
(74) *Attorney, Agent, or Firm* — Anthony V. England; Edell, Shapiro & Finnan, LLC

(57) ABSTRACT

A computer system automatically corrects a view of an image capture device. A view of an image capture device is adjusted by applying one or more modifications selected from a group of: a zoom modification, a pan modification, and a tilt modification, wherein the view is displayed at a client device during a viewing session and the one or more modifications are indicated by the client device. One or more corrective operations are applied to the adjusted view based on user input, wherein the one or more corrective operations include a rotational operation to correct the adjusted view. Subsequent operations based on the one or more corrective operations are applied during a subsequent viewing session with corresponding view settings. Embodiments of the present invention further include a method and program product for automatically correcting a view of an image capture device in substantially the same manner described above.

20 Claims, 7 Drawing Sheets

AUTOMATIC CORRECTION OF CAMERA VIEWS

BACKGROUND

1. Technical Field

Present invention embodiments relate to automatically correcting camera views, and more specifically, to the automatic correction of camera views based on prior adjustment history.

2. Discussion of the Related Art

Remotely-controllable cameras, also known as robotic cameras or pan-tilt-zoom cameras, are often adjusted in order to capture details of specific areas within their range. As a camera is zoomed, panned, or tilted, the camera's image orientation can often become skewed and therefore difficult to view. While some camera applications enable a user to manually correct the orientation, such corrections must be performed every time a user accesses the camera.

SUMMARY

According to one embodiment of the present invention, a computer system automatically corrects a view of an image capture device. A view of an image capture device is adjusted by applying one or more modifications selected from a group of: a zoom modification, a pan modification, and a tilt modification, wherein the view is displayed at a client device during a viewing session and the one or more modifications are indicated by the client device. One or more corrective operations are applied to the adjusted view based on user input, wherein the one or more corrective operations include a rotational operation to correct the adjusted view. Subsequent operations based on the one or more corrective operations are applied during a subsequent viewing session with corresponding view settings. Embodiments of the present invention further include a method and program product for automatically correcting a view of an image capture device in substantially the same manner described above.

BRIEF DESCRIPTION OF THE DRAWINGS

Generally, like reference numerals in the various figures are utilized to designate like components.

DETAILED DESCRIPTION

Figure 1:
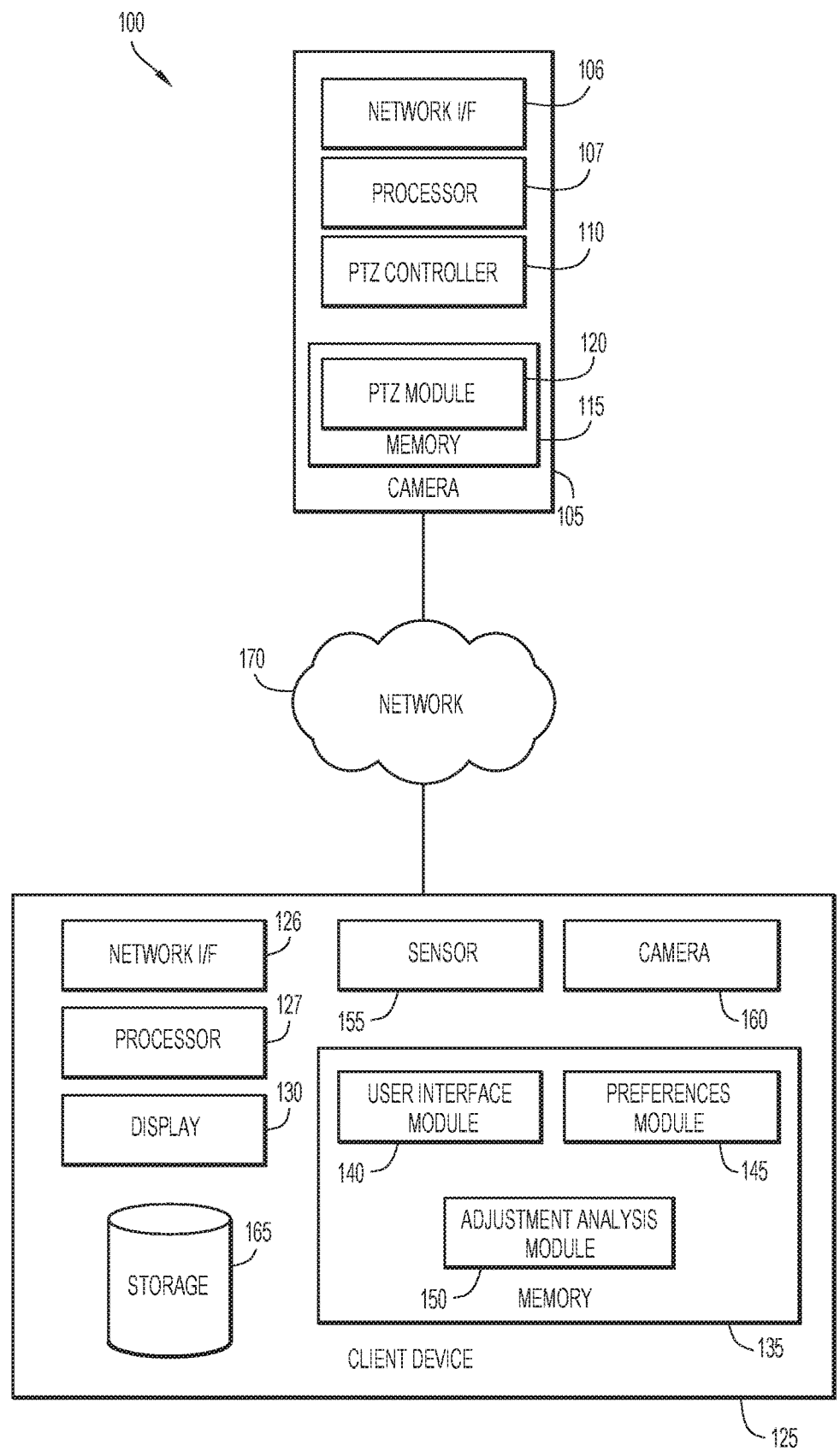
FIG. 1 is a block diagram depicting a computing environment for automatically correcting a view of an image capture device in accordance with an embodiment of the present invention.

Present invention embodiments relate to automatically correcting camera views, and more specifically, to the automatic correction of camera views based on prior adjustment history. A remotely-controllable camera transmits image data to another device, such as a smartphone, computer, or similar device having a display, so that a user may observe and modify the view of the camera. For example, a user may remotely control a camera by panning the camera left and right to observe the extents of a property. As a user changes the view of a camera by panning, tilting, and/or zooming, the resulting view can become skewed or otherwise distorted. For example, objects that are more or less vertical, such as trees, may appear to be skewed to the left or right. Conventional approaches to correcting such distortions can require repetitive manual correction each time a user initiates a viewing session of a camera.

In contrast, present invention embodiments capture and store orientation changes so that the view of an image capture device (e.g., camera, smartphone, etc.) can be automatically re-oriented during future viewing sessions. The image capture device may capture various items (e.g., still image, video, audio, etc.). A user can provide corrective actions either explicitly (e.g., by providing user input to manipulate a view) or implicitly (e.g., by tilting the user's head and/or smartphone, etc.). These corrective actions are saved for later use, so that when a user pans, tilts, or zooms the image capture device similarly in the future, the corrective actions may be automatically applied. Thus, present invention embodiments provide time and cost savings by eliminating unnecessary repetition of corrective tasks. Moreover, corrective actions can be applied to new combinations of pan, tilt, and/or zoom adjustments, without requiring further user input, by comparing new combinations of adjustments to prior adjustments.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for automatically correcting a view of an image capture device in accordance with an embodiment of the present invention. As depicted, computing environment 100 includes a camera or other image capture device 105, a client device 125, and a network 170. It is to be understood that the functional division among components of computing environment 100 have been chosen for purposes of explaining present invention embodiments and is not to be construed as a limiting example.

Camera 105 includes a network interface (I/F) 106, at least one processor 107, a pan-tilt-zoom (PTZ) controller 110, and memory 115 that includes PTZ module 120. Camera 105 may include any device for capturing image data, including still photography and/or video. Camera 105 may be remotely accessible via network interface 106, enabling image data to be transmitted via network 170 to other devices, such as client device 125. Camera 105 may be situated in an indoor or outdoor location, and can be placed in a particular location in order to capture image data of an area of interest.

PTZ controller 110 modifies settings of camera 105, including a pan setting, a tilt setting, and/or a zoom setting. It should be noted that the settings of camera 105 are not limited to only panning, tilting, and zooming, as PTZ controller 110 may support additional operations. PTZ controller 110 may include one or more motors for adjusting the pan setting, tilt setting, and/or zoom setting of camera 105. In particular, PTZ controller 110 may rotate camera 105 along a horizontal plane to modify the pan setting, may rotate camera 105 along a vertical plane to modify the tilt setting, and may extend or collapse a lens of camera 105 to modify the zoom setting. PTZ controller 110 may modify the settings of camera 105 according to instructions provided by PTZ module 120.

PTZ module 120 may include one or more modules or units to perform various functions of present invention embodiments described below. PTZ module 120 may be implemented by any combination of any quantity of software and/or hardware modules or units, and may reside within memory 115 of camera 105 for execution by a processor, such as processor 107.

PTZ module 120 includes software to modify the settings of camera 105. PTZ module 120 may receive instructions, via network interface 106, and execute the instructions to cause a modification to one or more settings of camera 105, including a pan setting, a tilt setting, and/or a zoom setting. For example, when PTZ module 120 receives an instruction to pan camera 105 ten degrees to one side, PTZ module 120 may cause PTZ controller 110 to rotate camera 105 horizontally for an amount of time until the requested change of ten degrees is achieved. Additionally or alternatively, PTZ module 120 may process image data once camera 105 has captured the data to achieve results similar to tilting, panning, and/or zooming. For example, PTZ module 120 may process captured image data to apply transformations, such as cropping an image to perform digital zooming.

Client device 125 includes a network interface (I/F) 126, at least one processor 127, a display 130, and memory 135. Memory 135 may include a user interface module 140, a preferences module 145, and an adjustment analysis module 150. Client device 125 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 126 enables components of client device 125 to send and receive data over a network, such as network 170. In general, a user of client device 125 may access, via user interface module 140, camera 105 to observe and/or modify views of camera 105. Client device 125 may include internal and external hardware components, as depicted and described in further detail with respect to FIG. 5.

Display 130 may include any electronic device capable of presenting information in a visual form. For example, display 130 may be a liquid crystal display (LCD), a cathode ray tube (CRT) display, a light-emitting diode (LED) display, an electronic ink display, and the like. Information relating to camera 105, including image data captured by camera 105 and settings of camera 105, may be presented to a user of client device 125 via display 130. For example, a user may observe a view of camera 105 in order to adjust the view settings of camera 105.

User interface module 140, preferences module 145, and adjustment analysis module 150 may include one or more modules or units to perform various functions of present invention embodiments described below. User interface module 140, preferences module 145, and adjustment analysis module 150 may be implemented by any combination of any quantity of software and/or hardware modules or units, and may reside within memory 135 of client device 125 for execution by a processor, such as processor 127.

User interface module 140 presents a user interface to display 130 of client device 125 so that a user may observe image data captured by camera 105 and/or may modify view settings of camera 105. The user interface may include options to observe live or historical image data captured by camera 105. A user of client device 125 may indicate changes to the view settings of camera 105 via user interface module 140. In particular, the user interface may include graphical interface elements, such as buttons, input fields, etc., through which a user may indicate changes to the view settings. For example, a user may click on arrows or scroll bars to control the pan setting, tilt setting, and zoom setting of camera 105. When a user provides input via user interface module 140, the input is converted to instructions that are received by PTZ module 120 of camera 105 to implement the requested modifications to the view settings of camera 105.

Preferences module 145 creates, manages, and modifies user preferences for views of camera 105, including corrective operations to be performed based on the view of camera 105. When a user modifies the view settings of camera 105, the resulting view may be skewed or otherwise distorted. For example, when a user zooms into an object in a corner of the field of view of camera 105, the resulting image may be skewed, causing objects that would normally be viewed as vertical to appear tilted to one side or the other. When a user corrects a distorted view or otherwise changes attributes of a view, preferences module 145 stores those corrective operations for future use. Corrective operations can include panning, tilting, and/or zooming operations, such as deskewing (i.e., leveling a tilted image), and/or defishing (i.e., removing the distortion caused by a fisheye lens), adjusting an aspect ratio, adjusting image attributes such as color, contrast, tint, saturation, and the like, and any other adjustment to image data captured by camera 105. Such operations may be performed at a software level (e.g., by applying transformations to image data captured by camera 105) and/or at a hardware level (e.g., by adjusting physical elements of camera 105).

Preferences module 145 may store user preferences in association with particular views of camera 105. Any corrective operation(s) may be linked to any combination of view settings. For example, preferences module 145 may store a corrective operation of deskewing a view by a particular angle when the camera is panned twenty degrees to the left. Inverse corrective operations can also be linked to opposite view settings: for example, an opposite deskewing operation (e.g. deskewing by rotating by the same angle in the opposite direction) may be associated with a similar view setting when the camera 105 is panned twenty degrees to the right. Preferences module 145 may store each corrective action as a user preference that is associated with a particular user and/or a particular camera 105.

Preferences module 145 applies saved corrective operations during subsequent viewing sessions when the view settings of camera 105 match view settings with which corrective operations have been associated. Thus, when a user pans and zooms camera 105 to a particular view that has already been corrected, preferences module 145 automatically applies the corresponding corrective operations. When there is no corrective operation associated with a particular combination of pan, tilt, and/or zoom settings, adjustment analysis module 150 may assign corrective operations that are similar to the corrective operations of the view settings that most closely match the current view settings. When current view settings are within a predetermined threshold of similarity to view settings with assigned corrective operations, preferences module 145 may snap the current view to the similar view (e.g., apply the view settings of the similar view), and then apply the corrective operations assigned to the similar view.

In some embodiments, preferences module 145 determines corrective operations for a particular view based on prior corrective operations. When current view settings are within a predetermined threshold of similarity to view settings with assigned corrective operations, preferences module 145 may apply corrective operations that are scaled based on the difference of the current view. For example, when a previous zoom setting is associated with a deskewing operation that rotates the view twenty degrees clockwise, and the user's current view is zoomed in halfway to the previous zoom setting, preferences module 145 may apply a deskewing operation of a smaller magnitude, such as a ten degree clockwise rotation. In some embodiments, preferences module 145 identifies multiple stored orientations that most closely match a current view, and apply corrective operations based on an average of the corrective operations of the multiple stored orientations.

Adjustment analysis module 150 processes user input to determine corrective operations that can be applied to views of camera 105. User input may include any input associated with corrective operations to a view of camera 105 that is presented on display 130, such as deskewing or defishing operations, contrast, color, or brightness adjustments, and the like. In some embodiments, the user input is explicit user input that is manually provided by a user. For example, a user may indicate corrective operations via a user interface of user interface module 140. Additionally or alternatively, user input may include implicit user input that adjustment analysis module 150 obtains by analyzing user activity. For example, when a user tilts display 130 of client device 125 at a certain angle relative to the user's head, adjustment analysis module 150 may determine that a deskewing operation should be applied to the view of camera 105 at an angle having the same magnitude, but in an opposite direction. Adjustment analysis module 150 can determine a deskewing angle by analyzing user feedback capture from sensor 155 and/or camera or other image capture device 160. Sensor 155 measures a tilt of client device 125, and may include an accelerometer, gyroscope, or any other sensor capable of measuring tilt. Camera 160 may include any device for capturing image data, including still photography and/or video. In particular, adjustment analysis module 150 may analyze data captured by camera 160 to determine a tilt of client device 125 relative to a user's head. Adjustment analysis module 150 may employ conventional or other image recognition technology to determine the orientation of a user's head compared to the tilt of client device 125. In some embodiments, adjustment analysis module 150 determines pupil or eye orientation to determine how a user has tilted his or her head relative to the view of camera 105 being displayed on display 130.

Storage 165 may include any non-volatile storage media known in the art. For example, storage 165 can be implemented with a tape library, optical library, one or more independent hard disk drives, or multiple hard disk drives in a redundant array of independent disks (RAID). Similarly, data in storage 165 may conform to any suitable storage architecture known in the art, such as a file, a relational database, an object-oriented database, and/or one or more tables. In some embodiments, storage 165 may store data relating to automatic correction of camera views, including view settings for one or more cameras 105, and corrective operations for view settings, including associations between corrective operations and view settings.

Network 170 may include a local area network (LAN), a wide area network (WAN) such as the Internet, or a combination of the two, and includes wired, wireless, or fiber optic connections. In general, network 170 can be any combination of connections and protocols known in the art that will support communications between camera 105 and client device 125 via their respective network interfaces in accordance with embodiments of the present invention.

Figure 2:
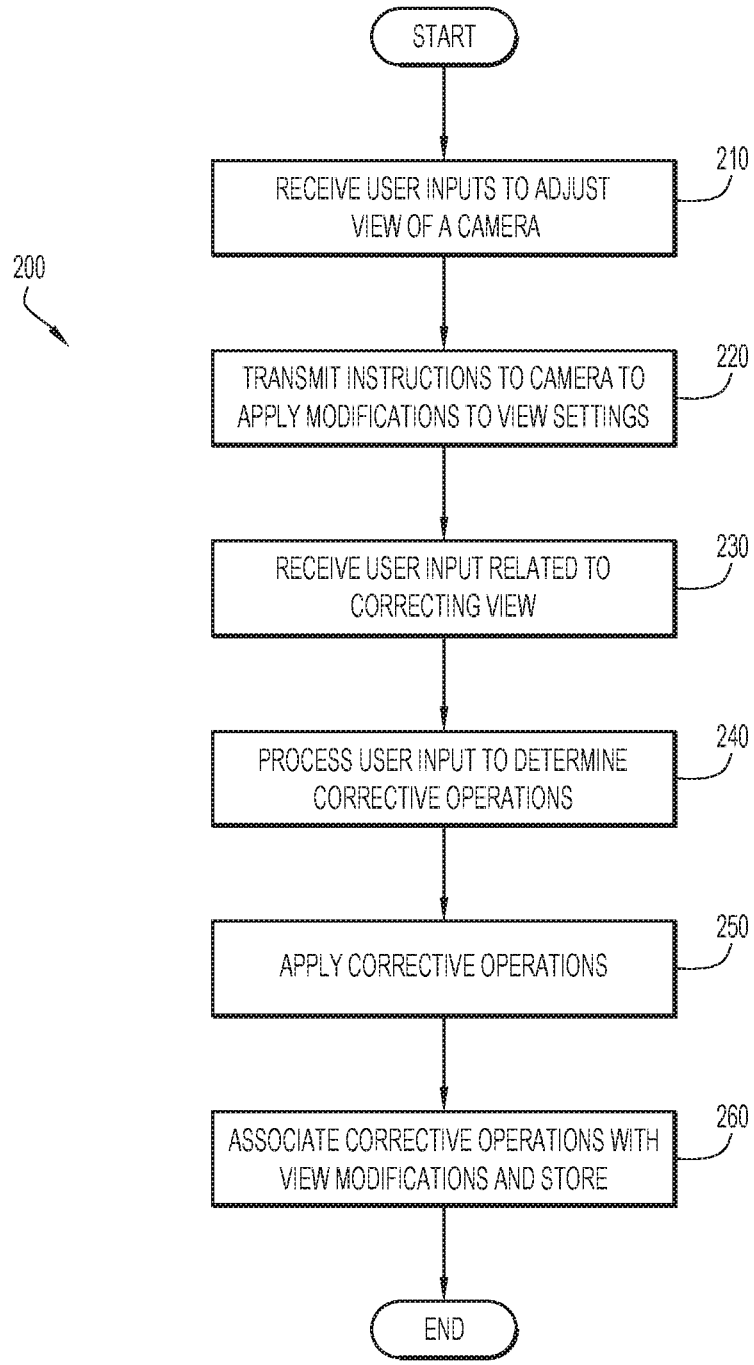
FIG. 2 is a flow chart depicting a method of determining corrective operations for a view of an image capture device in accordance with an embodiment of the present invention.

FIG. 2 is a flow chart depicting a method 200 of determining corrective operations for a view of a camera or other image capture device in accordance with an embodiment of the present invention.

One or more user inputs to adjust a view of a camera are received at operation 210. A user of client device 125 may initiate a session to view image data captured by camera 105. During the session, the user may provide inputs to modify the view settings of camera 105, such as pan, tilt, and zoom settings.

Instructions are transmitted to the camera to apply modifications to view settings of the camera at operation 220. The instructions may be transmitted via network 170 to camera 105, which receives the instructions, processes the instructions using PTZ module 120, and applies the instructions to change view settings of camera 105. For example, user instructions may cause camera 105 to pan, tilt, and/or zoom to a particular region or object that is observable by camera 105.

User input related to corrective operations is received at operation 230. User input may include explicit input in which a user manually indicates corrections to a view. Additionally or alternatively, user input may include implicit input, which includes any user feedback, including movement of the user's body, that indicates that a corrective operation may be desired. Corrective operations may include panning, tilting, and zooming operations, including deskewing operations, as well as defishing operations, aspect ratio adjustments, adjustment of image attributes such as color, contrast, tint, saturation, and the like. In some embodiments, deskewing operations are based on a tilt angle of client device 125, which can be determined according to data collected by sensor 155. In some embodiments, deskewing operations are determined based on a tilt angle of client device 125 relative to a user, which can be determined by comparing the tilt of client device 125 (as determined by sensor 155) to the tilt of a user's head (as determined by processing image data collected by camera 160). In order to accommodate shaky hands or other unintended user movement, tilt data may be collected after a configurable time period has elapsed. For example, after a user provides input to adjust a view of camera 105, a time period of 500 ms may elapse before determining whether client device 125 is tilted relative to the user, and collecting tilt data accordingly.

The user input is processed to determine corrective operations to be applied at operation 240. Explicit user input may correspond to predetermined corrective operations. To determine corrective operations, adjustment analysis module 150 may measure an angle between the user's head relative to display 130 of client device 125, and determine a corrective action that includes rotating the image data presented on display 130 by an angular value of the same magnitude but in an opposite direction.

The corrective operations are applied at operation 250, and the corrective operations are associated with the view settings and stored at operation 260. Each corrective operation may be associated with one or more of the settings, including a pan setting, tilt setting, and/or zoom setting, so that when a user applies similar or identical settings in the future, the corrective actions may be automatically applied.

Figure 3:
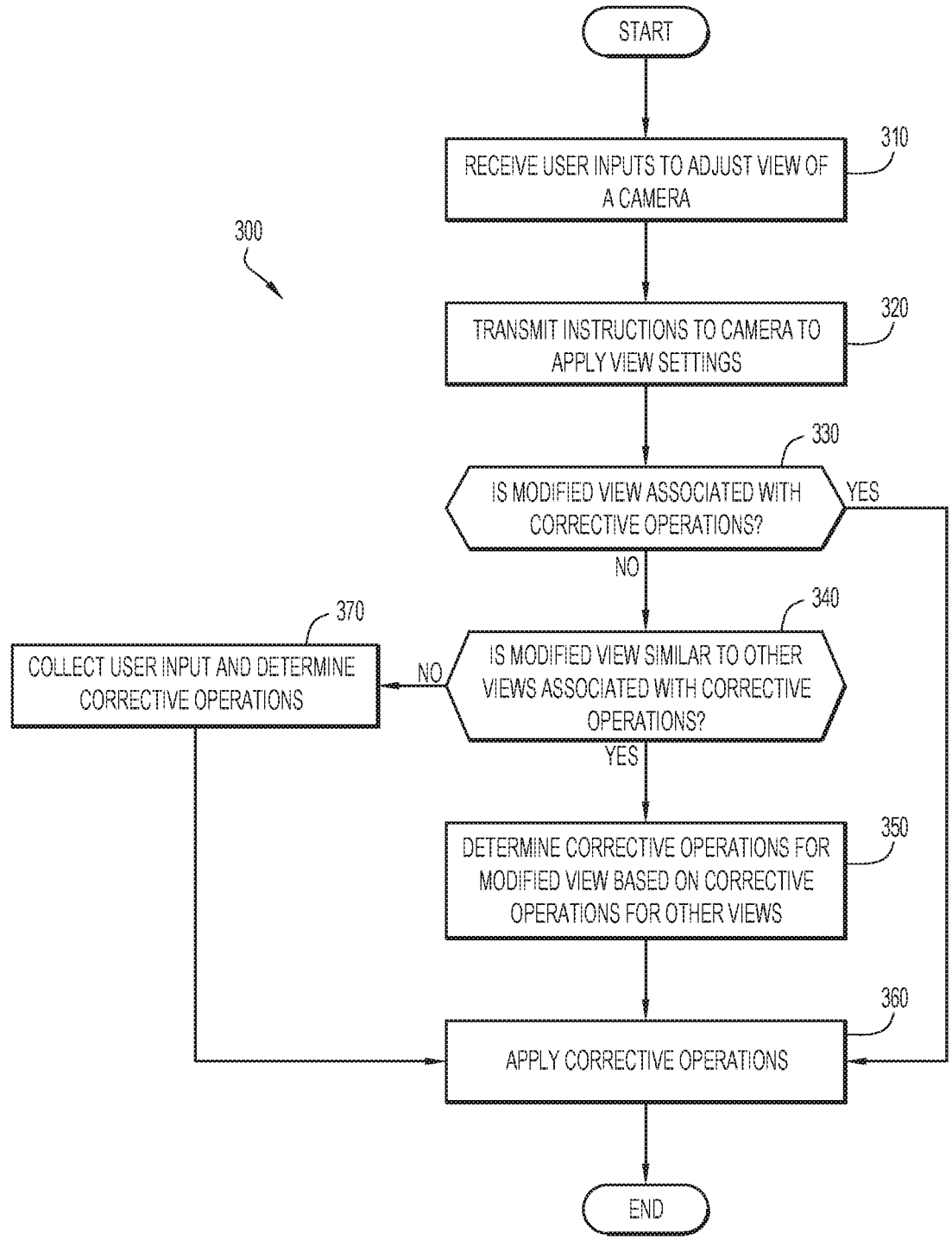
FIG. 3 is a flow chart depicting a method of applying corrective operations to automatically correct a view of an image capture device in accordance with an embodiment of the present invention.

FIG. 3 is a flow chart depicting a method 300 of applying corrective operations to automatically correct a view of a camera or other image capture device in accordance with an embodiment of the present invention.

User inputs to adjust a view of a camera are received at operation 310, and the instructions are transmitted to the camera to cause the camera's view settings to be modified at operation 320.

Operation 330 determines whether the modified view is associated with corrective operations. Preferences module 145 may determine if any corrective operations exist that are associated with one or more of view settings. If corrective operations are associated with the currently modified view, then the corrective operations are applied at operation 360.

If there are no corrective operations associated with the currently modified view, operation 340 determines whether the modified view is similar to other views that are associated with corrective operations, and corrective operations for the modified view are determined based on the corrective operations associated with the other views at operation 350. For example, a view of "zoom in 25%, pan 15 degrees left, tilt 9 degrees up" may not be associated with any corrective operations, but a view of "zoom in 22%, pan 13 degrees left, tilt 8 degrees up" may be associated with corrective operations. Thus, if the current view settings surpass a similarity threshold to view settings that are associated with corrective operations, the current view may snap to the similar view settings and/or the corrective operations may be applied. In some embodiments, corrective operations may be scaled based on the degree of similarity of the view settings of a currently modified view to other view settings. Once determined, the corrective operations are applied at operation 360.

If the view settings of the modified view are not similar to any other views that are associated with corrective operations, then user input is collected and corrective operations are determined at operation 370. User input may be collected and processed to determine corrective operations according to embodiments presented herein, such as method 200. Once determined, the corrective operations are applied at operation 360.

Figure 4A:
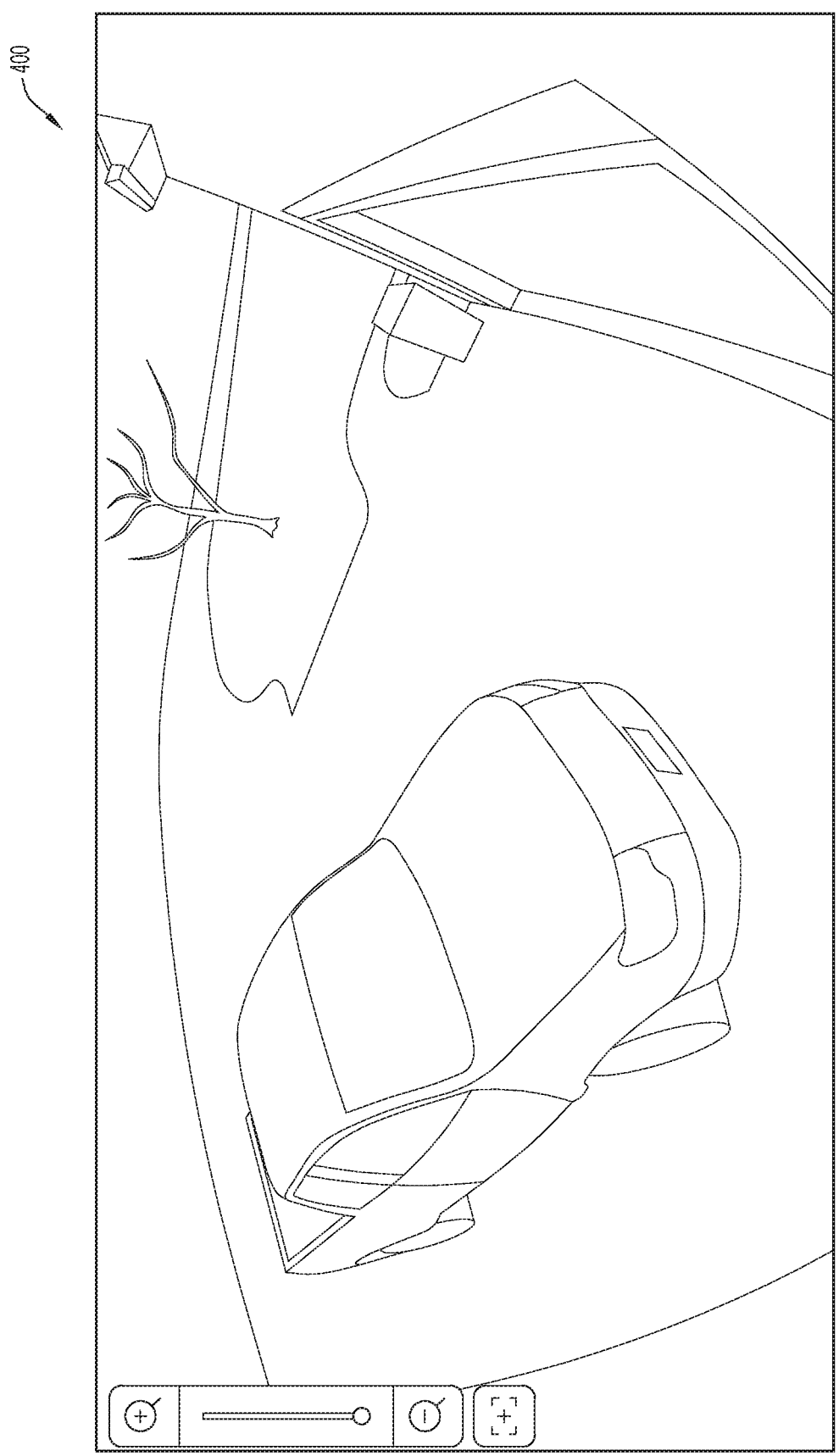
FIGS. 4A-4C are diagrams depicting views of an image capture device in accordance with an embodiment of the present invention.
Figure 4B:
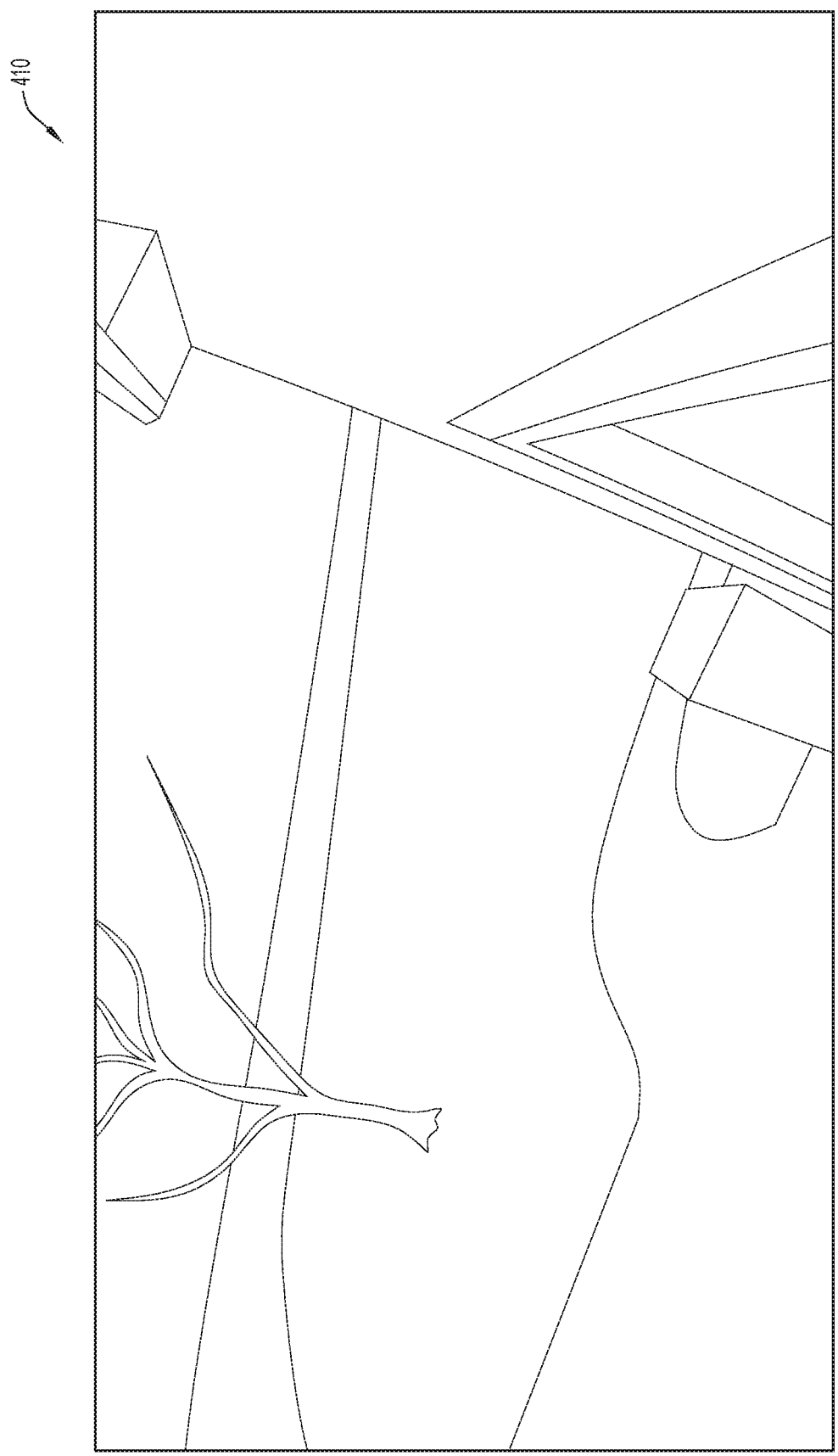
Figure 4C:
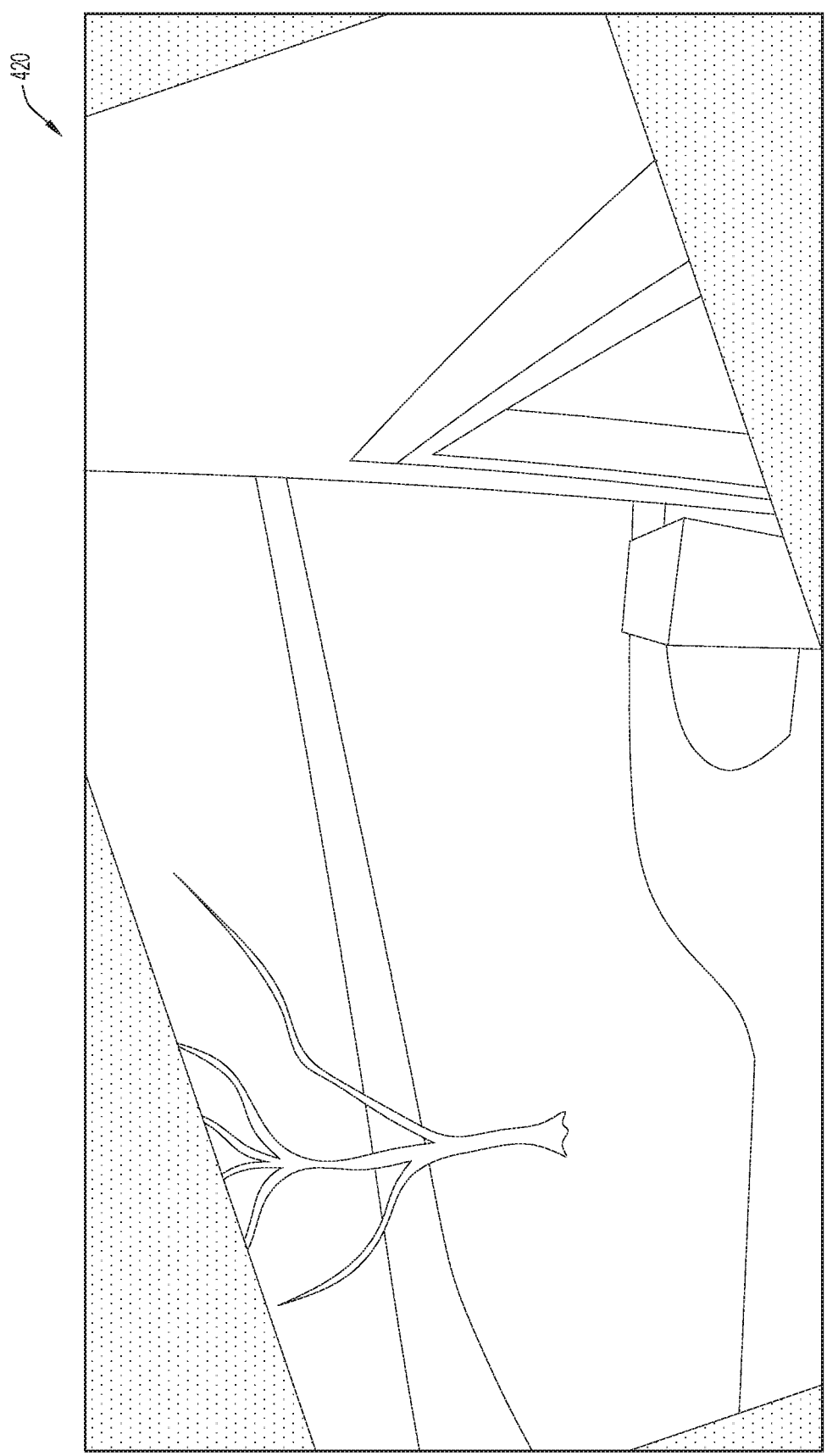

FIGS. 4A-4C are diagrams depicting example views of a camera or other image capture device in accordance with an embodiment of the present invention.

FIG. 4A depicts an example view 400 of a camera prior to applying modifications to the view settings. View 400 may be captured by camera 105 and may be a default view or a view resulting from prior modifications to view settings.

FIG. 4B depicts an example view 410 of a camera after applying modifications to the view settings. As compared to view 400, the zoom, pan, and/or tilt settings of camera 105 have been modified, causing view 410 to be skewed.

FIG. 4C depicts an example view 420 of a camera after applying corrective operations in accordance with present invention embodiments. In particular, a deskewing operation has been applied to straighten view 420. The deskewing operation can be determined based on user feedback, or by applying corrective operation associated with one or more of the view settings of view 410.

Figure 5:
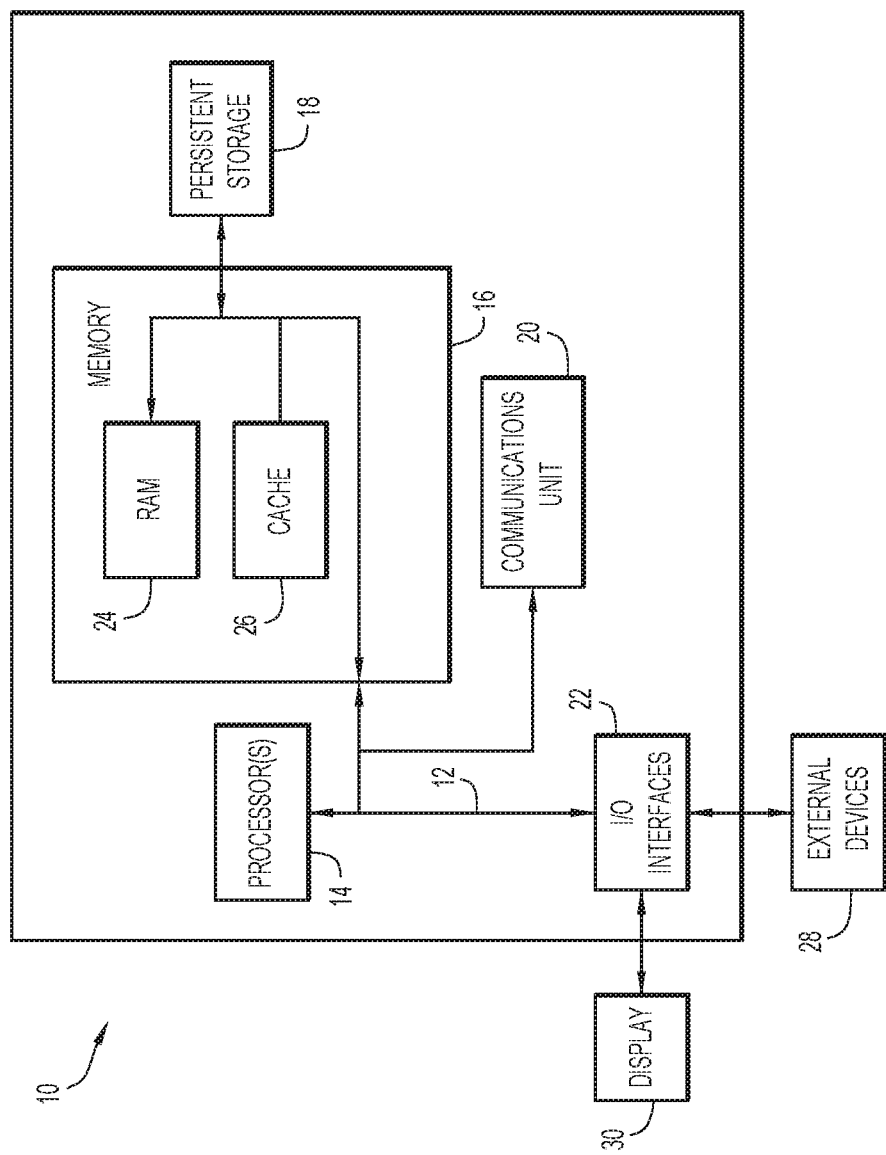
FIG. 5 is a block diagram depicting a computing device in accordance with an embodiment of the present invention.

FIG. 5 is a block diagram depicting components of a computer 10 suitable for executing the methods disclosed herein. Computer 10 may implement client device 125 and/or camera 105 in accordance with embodiments of the present invention. It should be appreciated that FIG. 5 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to automatic correction of camera views (e.g., user preferences, view settings information, user input related to corrective operations (including explicit and implicit user input), corrective operation information, associations between view settings and corrective operations, etc.) may be stored within any conventional or other data structures (e.g., files, arrays, lists, stacks, queues, records, etc.) and may be stored in any desired storage unit (e.g., database, data or other repositories, queue, etc.). The data transmitted between camera 105 and client device 125 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to automatic correction of camera views (e.g., user preferences, view settings information, user input related to corrective operations (including explicit and implicit user input), corrective operation information, associations between view settings and corrective operations, etc.) may include any information provided to, or generated by, camera 105 and/or client device 125. Data relating to automatic correction of camera views may include any desired format and arrangement, and may include any quantity of any types of fields of any size to store any desired data. The data relating to automatic correction of camera views may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to automatic correction of camera views), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of automatically correcting camera views.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, PTZ module 120, user interface module 140, preferences module 145, adjustment analysis module 150, etc.). These systems may include any types of monitors and input devices (e.g., keyboard, mouse, voice recognition, etc.) to enter and/or view information.

It is to be understood that the software (e.g., communications software, server software, PTZ module 120, user interface module 140, preferences module 145, adjustment analysis module 150, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, PTZ module 120, user interface module 140, preferences module 145, adjustment analysis module 150, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to automatic correction of camera views). The database system may be implemented by any number of any conventional or other databases, data stores or storage structures (e.g., files, databases, data structures, data or other repositories, etc.) to store information (e.g., data relating to automatic correction of camera views). The database system may be included within or coupled to the server and/or client systems. The database systems and/or storage structures may be remote from or local to the computer or other processing systems, and may store any desired data (e.g., data relating to automatic correction of camera views).

The present invention embodiments may employ any number of any type of user interface (e.g., Graphical User Interface (GUI), command-line, prompt, etc.) for obtaining or providing information (e.g., data relating to automatic correction of camera views), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, correcting views of any image or video.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for automatically correcting a view of an image capture device, the computer-implemented method comprising:
    adjusting a view of an image capture device by applying one or more modifications selected from a group of: a zoom modification, a pan modification, and a tilt modification, wherein the view is displayed at a client device during a viewing session and the one or more modifications are indicated by the client device;
    applying one or more corrective operations to the adjusted view based on user input, wherein the one or more corrective operations include a rotational operation to correct the adjusted view; and
    applying subsequent operations automatically based on the one or more corrective operations during a subsequent viewing session with corresponding view settings, wherein the subsequent operations repeat at least a portion of the one or more corrective operations.

2. The computer-implemented method of claim 1, wherein the rotational operation corrects the view based on a tilt angle of the client device relative to a user's head.

3. The computer-implemented method of claim 2, wherein the tilt angle is determined when the client device is stationary for a predetermined amount of time.

4. The computer-implemented method of claim 1, wherein the one or more corrective operations further include one or more corrective operations selected from a group of: a contrast adjustment, a color adjustment, a deskewing operation, and a defishing operation.

5. The computer-implemented method of claim 1, wherein the subsequent operations based on the one or more corrective operations are automatically performed when the subsequent viewing session surpasses a threshold of similarity to the adjusted view.

6. The computer-implemented method of claim 1, wherein the subsequent operations based on the one or more corrective operations are scaled based on a difference between the adjusted view and a view of the image capture device during the subsequent viewing session.

7. The computer-implemented method of claim 1, wherein the subsequent operations based on the one or more corrective operations are further based on corrective operations determined from a plurality of previous viewing sessions.

8. A computer system for automatically correcting a view of an image capture device, the computer system comprising:
    one or more computer processors;
    one or more computer readable storage media;
    program instructions stored on the one or more computer readable storage media for execution by at least one of the one or more computer processors, the program instructions comprising instructions to:
    adjust a view of an image capture device by applying one or more modifications selected from a group of: a zoom modification, a pan modification, and a tilt modification, wherein the view is displayed at a client device during a viewing session and the one or more modifications are indicated by the client device;
    apply one or more corrective operations to the adjusted view based on user input, wherein the one or more corrective operations include a rotational operation to correct the adjusted view; and apply subsequent operations automatically based on the one or more corrective operations during a subsequent viewing session with corresponding view settings, wherein the subsequent operations repeat at least a portion of the one or more corrective operations.

9. The computer system of claim 8, wherein the rotational operation corrects the view based on a tilt angle of the client device relative to a user's head.

10. The computer system of claim 9, wherein the tilt angle is determined when the client device is stationary for a predetermined amount of time.

11. The computer system of claim 8, wherein the one or more corrective operations further include one or more corrective operations selected from a group of: a contrast adjustment, a color adjustment, a deskewing operation, and a defishing operation.

12. The computer system of claim 8, wherein the subsequent operations based on the one or more corrective operations are automatically performed when the subsequent viewing session surpasses a threshold of similarity to the adjusted view.

13. The computer system of claim 8, wherein the subsequent operations based on the one or more corrective operations are scaled based on a difference between the adjusted view and a view of the image capture device during the subsequent viewing session.

14. The computer system of claim 8, wherein the subsequent operations based on the one or more corrective operations are further based on corrective operations determined from a plurality of previous viewing sessions.

15. A computer program product for automatically correcting a view of a camera, the computer program product comprising one or more computer readable storage media collectively having program instructions embodied therewith, the program instructions executable by a computer to cause the computer to:

adjust a view of an image capture device by applying one or more modifications selected from a group of: a zoom modification, a pan modification, and a tilt modification, wherein the view is displayed at a client device during a viewing session and the one or more modifications are indicated by the client device;

apply one or more corrective operations to the adjusted view based on user input, wherein the one or more corrective operations include a rotational operation to correct the adjusted view; and apply subsequent operations automatically based on the one or more corrective operations during a subsequent viewing session with corresponding view settings, wherein the subsequent operations repeat at least a portion of the one or more corrective operations.

16. The computer program product of claim 15, wherein the rotational operation corrects the view based on a tilt angle of the client device relative to a user's head.

17. The computer program product of claim 16, wherein the tilt angle is determined when the client device is stationary for a predetermined amount of time.

18. The computer program product of claim 15, wherein the one or more corrective operations further include one or more corrective operations selected from a group of: a contrast adjustment, a color adjustment, a deskewing operation, and a defishing operation.

19. The computer program product of claim 15, wherein the subsequent operations based on the one or more corrective operations are automatically performed when the subsequent viewing session surpasses a threshold of similarity to the adjusted view.

20. The computer program product of claim 15, wherein the subsequent operations based on the one or more corrective operations are scaled based on a difference between the adjusted view and a view of the image capture device during the subsequent viewing session.

\* \* \* \* \*